July 20, 1965 E. J. SCHNEBERGER ETAL 3,196,418
MONITORING SYSTEM
Filed Feb. 13, 1963
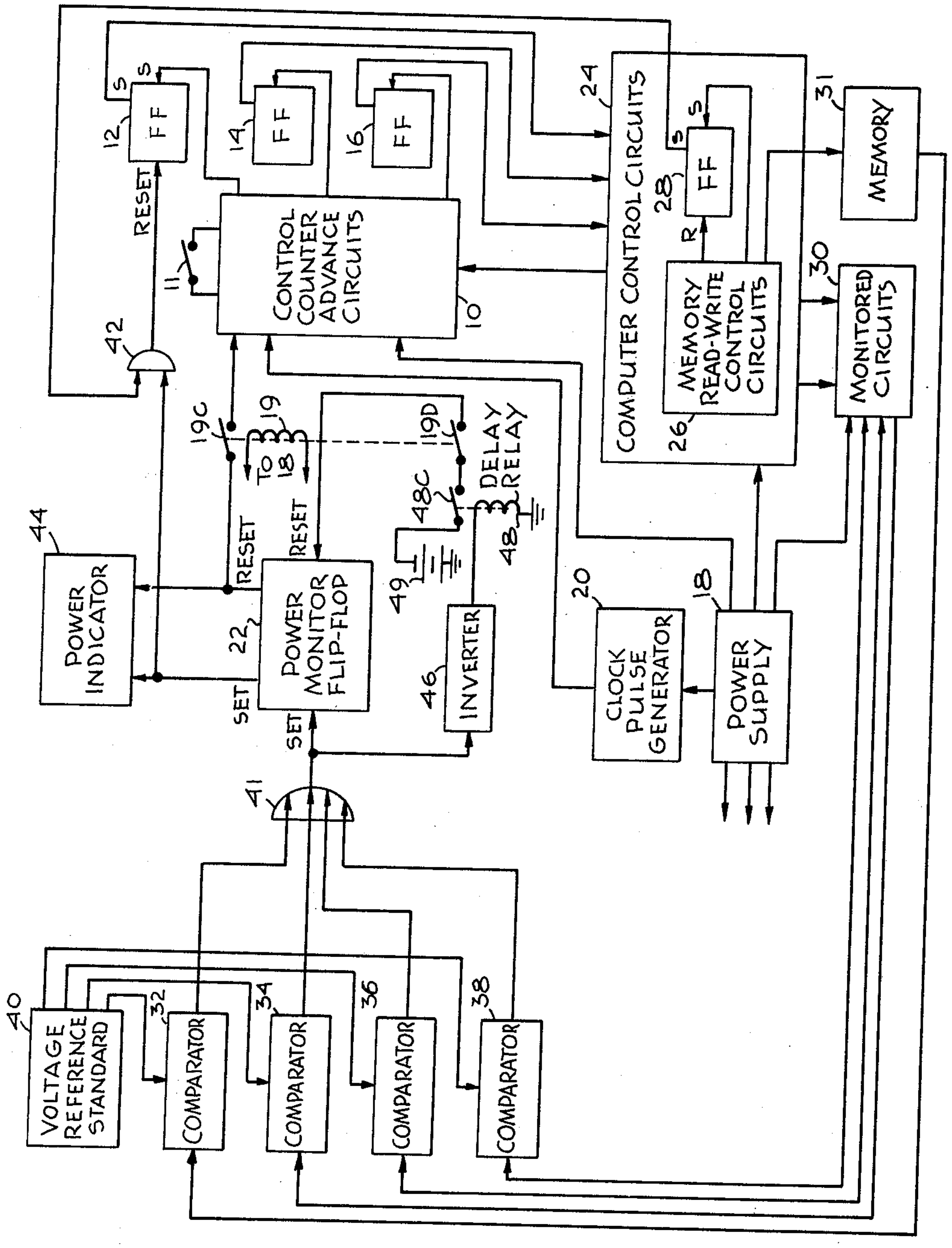
INVENTORS
EDWARD J. SCHNEBERGER
MILTON G. BIENHOFF
BY
Samuel Lindenberg
ATTORNEY

United States Patent Office 3,196,418

Patented July 20, 1965

3,196,418
MONITORING SYSTEM

Edward J. Schneberger and Milton G. Bienhoff, Canoga Park, Calif., assignors, by mesne assignments, to The Bunker-Ramo Corporation, Stamford, Conn., a corporation of Delaware Filed Feb. 13, 1963, Ser. No. 258,280
5 Claims. (Cl. 340—174)

This invention relates generally to digital computers and more particularly to a system for continuously monitoring critical digital computer operating parameters, e.g., voltages, temperatures, etc. in order to prevent loss of any information stored in the memory thereof.

In order to maintain a computer operating with maximum accuracy and efficiency it is necessary to insure that the voltages being applied to the various circuits of the computer are maintained at their optimum values or within tolerable variations therefrom. Despite rigid preventive maintenance and inspection, it does happen that components deteriorate so as to cause problems between inspection intervals. Also, transients can cause voltage fluctuations which can provide problems.

The conventional magnetic core memory is one of a class of destructive read out memories which finds considerable use in digital computers. Destructive read out refers to that characteristic of a memory which requires that information to be retained be written back into the memory after it is read out since the reading process destroys the stored information. The sequence of reading information from and writing it back into memory is referred to as a memory cycle. The opration of a magnetic core memory, both for the purpose of writing or reading, requires that the voltages which are applied thereto, be maintained substantially constant. Attempts to write information into the memory when voltage levels are out of prescribed limits cause the information either to be stored incorrectly or not stored at all. For example, where the magnitude of a drive current is below a threshold value, it will be insufficient to switch a magnetic core from one to the other of its states of magnetic remanence. On the other hand a drive current greater in magnitude than a threshold value passed through a winding threaded through cores not intended to be switched, as for example in coincident current memories, will incorrectly switch such cores.

The loss of information by a computer, either consisting of data or of command information, can lead to erroneous and valueless computations. Since computer time is extremely valuable, such incorrect computations can be very costly. In the case of computers of the type in which program instructions are stored in the magnetic core memory to be called out in sequence and then written back into the memory, the loss of an instruction means that either the entire set of instructions has to be re-written into the memory, or some means must be found for searching through the memory to determine which of the instructions is lost and then replacing this instruction. It can therefore be appreciated that the loss of an instruction is rather serious.

Many readily available computers use monitoring equipment to determine whether critical voltage levels throughout the computer are being maintained within certain prescribed limits in order to prevent loss of certain voltages which would severely damage the equipment if certain other voltages remained at normal levels. In view of this, conventional monitoring systems respond to the detection of an out of limits voltage by stopping the operation of the computer until the condition is corrected. Subsequent to the correction, the computer is instructed to resume its operation. Since the stopping of the operation of the computer may occur during a cycle of the memory, information originally in the computer is very likely to be lost since abnormal voltages will alter the data to be re-written into the memory.

Even after the condition causing the abnormal voltage is corrected, unreliable computer operation is thereafter often encountered in prior art systems due to the fact that computer operation is often initiated before transients disappear and the voltages become properly stabilized.

In view of the foregoing, it is an object of this invention to provide an improved power monitoring arrangement which eliminates the heretofore discussed problem of losing information which is to be written in the memory.

Another object of this invention is the provision of a monitoring arrangement for the power supply of a computer which after a defect is corrected prevents the initiation of the computer operations for a time long enough to insure that operating conditions become properly stabilized.

Yet another object of the present invention is the provision of a novel, useful and unique monitoring arrangement for a power supply of a computer.

These and other objects of this invention are provided for in an arrangement wherein the monitoring circuits of the computers are arranged to sense the various parameters (voltage, temperature, etc.) throughout the computer and to provide a signal indicative of a departure from the predetermined desired operational range. This signal is applied to a gate which, however, is not enabled until another signal is received which indicates that the memory has completed a write operation. Responsive to the coincidence of both signals the gate applies an output signal to a circuit arrangement which in turn stops the computer operation.

Since the power supply voltages decay exponentially, the voltage monitors can be and are set to provide the signal to the gate while the voltages of the computer are sufficiently high to insure that a successful writing operation can take place. Upon the required voltage levels being restored by the power supply, a signal indicative of this is provided. However, this signal cannot return the computer to operation unless it has existed for a predetermined time interval thereby indicating that the power provided by the power supply will be maintained.

Reference is now made to a drawing which illustrates the embodiment of the invention. As indicated previously, the embodiment of the invention is intended to be employed with a digital computer. In an attempt to simplify both the drawing and the description, only so much of the requisite computer structure will be referred to as is necessary to enable anyone skilled in the art to understand the invention and how it may be incorporated within a computer.

The problem of preventing the loss of instructions from a computer is most serious with a computer of the stored logic type where the actual operation and sequencing of the computer is dependent upon the sequence of instructions which are read out of the magnetic core memory. For the purpose of processing data, these instructions are used repetitively for a considerable number of times, and it should therefore be appreciated why the loss of any one of the instructions is serious. A stored logic computer of the type utilizing this invention, and segments of which are described herein for orienting this invention, is shown, described and claimed in an application for a Stored Logic Computer by Schneberger et al., Ser. No. 164,660, filed January 8, 1962, and assigned to a common assignee.

In the aforesaid computer, in order to initiate the operation thereof, after the computer power supply 18 energizes the computer, a control counter including three flip-flop circuits 12, 14 and 16 is sequenced through various count states to effectuate various operations and to provide the requisite delays required for the various components of the computer to be placed in condition for proper data processing. The control counter advance circuit 10 upon closure of a switch 11 on the computer control panel (not shown) applies signals to the three flip-flops respectively, 12, 14 and 16, to sequence them through various count states. The control counter advance circuit receives, besides the signal from the control panel of the computer (not shown) a signal from the power supply 18, of the computer, as well as a signal from the clock pulse generator 20 for the computer. The control counter advance circuit must also receive a reset signal from the output of a power monitor flip-flop 22, indicative of the fact that power has been applied to the computer for a predetermined time interval which is sufficient to insure that, at least for the foreseeable future, it will be maintained. The details of this operation will be shown subsequently herein. The flip-flop 22 has its reset output connected to the control counter advance circuit through the contacts 19C of a relay 19, which is rendered operative whenever the power supply is operative.

The flip-flops 12, 14 and 16 advance through various states in response to signals received from the control counter advance circuits 10. The output terminals of each of the flip-flops are connected to the computer control circuits 24 representing the logical circuits of the computer which decode instructions or commands and in response thereto, operate the computer apparatus itself. The computer control circuits 24 include gating logic which indicates when the various structures of the computer have attained predetermined states, whereby a succeeding operation of the computer can be initiated.

One of the flip-flops 12, of the control counter assumes its set state when the control counter advance circuit 10 signals that the computer is in running condition and the computer can then proceed with the operations at hand. When the flip-flop 12 is not in its set state, then the computer control circuits cannot instruct the computer to continue its operations. This is indicated in the drawing by a connection being made between the set output of the flip-flop 12 and the computer control circuit 24.

The computer control circuit 24 includes the memory-read-write control circuits 26 and a flip-flop circuit 28. Whenever the memory-read-write control circuits are in a write mode, then the flip-flop 28 is driven to its set state. Whenever the memory-read-write control circuits are in a mode other than the write mode, then flip-flop 28 is driven to its reset state by these circuits.

The computer control circuits 24 are connected to the remainder of the computer which includes the circuits 30 being monitored as well as the memory 31. Connections are made at desired points for applying the voltages and other parameters from the computer circuits 30 to a plurality of comparator circuits, respectively 32, 34, 36 and 38. Each one of these comparator circuits is connected to a reference standard source 40, in order to compare the various parameters being sampled with the reference. When the sampled parameter varies by a predetermined amount (five percent in the computer circuit referred to previously) then an output from the comparator circuit sensing this variation can drive the power monitor flip-flop 22 to its set state.

In order to drive the power monitor flip-flop 22, all of the outputs of the comparators 32 through 38 are connected to an OR gate 41. The output of the OR gate is connected to the set input of the power monitor flip-flop 22. The set output of flip-flop 22 is applied to AND gate 42. However, this AND gate cannot drive the flip-flop 12 to its reset state whereby the computer would be stopped, unless and until an output is received from the reset output of the flip-flop 28 indicating that memory cycle is complete. Upon the coincidence of the reset output of the flip-flop 28 and the set output of the power monitor flip-flop 22, then AND gate 42 can drive flip-flop 12 to its set state, whereupon the computer operation is stopped.

It should be appreciated that the power monitoring arrangement in accordance with this invention does not turn off the computer until a writing operation has taken place, thereby assuring that no information is lost in the computer due to an undesired variation in the power received from the power supply 18. If the described action was not taken until the power dropped to inoperative levels or if a power variation instantaneously cut off the operation of the computer, the loss of information encountered in other monitoring systems would not be avoided.

The power monitor flip-flop 22 drives a power indicator 44 whose function it is to indicate to the operator of the computer that the operation of the computer has been interrupted because of the variations in the power supply.

If power was totally shut off, upon the restoration of power by the power supply, then the relay 19 can close its contacts respectively 19C and 19D. Contacts 19C are connected between the reset output of the power monitor flip-flop 22 and the control counter advance circuit 10. The set output of the OR gate 41 is removed provided that the monitored voltages are within the tolerances which have been previously established. Upon removal of the output of OR gate 41, an inverter circuit 46 can apply its output to a delay relay 48. The delay relay 48 delays the closing of its contacts 48C for an interval determined as the interval required for the power supply to apply voltages to the computer, following which it has been fairly well determined that such voltages will be maintained. Upon the end of this predetermined interval (on the order of 50 microseconds for the previously mentioned computer) contacts 48C are closed, applying a potential from a source 49 through the previously closed contacts 19D of relay 19 to the reset input terminal of the power monitor flip-flop. The power monitor flip-flop is then reset and the control counter advance circuit can then sequence the control counter flip-flops 12, 14 and 16 to the condition whereby they enable the computer to either continue its interrupted operation or to operate in an interrupt mode as specified by the program for the computer in the event of a power interruption.

The embodiment of the invention which has been described hereinabove operates to prevent the loss of information by a computer in the event that there is a deterioration or variation in the voltages being provided by the power supply. The invention also prevents the turn on of the computer, unless the monitored voltages have been restored to their predetermined values and such restoration has occurred for a time sufficient to insure that the power supply will maintain the required voltages. While all the circuits herein have been represented as rectangles, these circuits are well known and their interconnection and operation in the manner described herein should be apparent to those skilled in this art. Although primary attention has been given herein to the monitoring of voltages at various key points of the computer, it should be understood that other parameters such as temperatures of the core memory stack can be similarly monitored. By means of thermocouples these temperatures are easily convertible to voltages which can be compared to a standard in the manner previously described to effectuate the operation desired.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The embodiments of the invention in which an exclusive property or privilege is claimed are defined as follows:

1. In combination with digital apparatus employing a memory system including an information storage device and means for reading information from and writing information into said storage device, a system for monitoring various parameters in said apparatus for preventing said means from reading information when any one of said parameters deviates from a prescribed value by greater than a predetermined amount, said system comprising:

means for measuring the value of each of said parameters:

means for comparing each measured value with a prescribed value and for generating a first signal responsive to a deviation therebetween of greater than a prescribed amount;

means for generating a second signal responsive to the writing of information into said storage device;

and means responsive to the coincidence of said first and second signals for preventing information from being read from said storage device.

2. The combination of claim 1 wherein said parameters comprise voltages and temperatures.

3. In a computer of the type having a memory including apparatus operable to write information into said memory and means for providing operating voltages for said computer;

means for monitoring said operating voltages comprising means for determining when any one of said operating voltages departs from a predetermined value and for generating a first signal in response thereto;

means for generating a second signal in response to the operation of said apparatus operable to write information into said memory; and means responsive to the coincidence of said first and second signals for terminating further operation of said computer.

4. In a computer of the type having a memory including apparatus operable to write information into said memory and a power supply for providing operating voltages to said computer, the improvement comprising:

means for monitoring said operating voltages for providing a first signal indicative of the departure of at least one of said operating voltages from a predetermined range;

means responsive to the operation of said apparatus operable to write information into said memory for generating a second signal;

means responsive to the simultaneous occurrence of said first and second signals for terminating further operation of said computer, and means responsive to said power supply again providing operating voltages within predetermined ranges for restoring the operation of said computer after a predetermined interval of the application of said operating voltages.

5. In a computer of the type having a memory with apparatus for writing into and reading from said memory, and having a power supply for providing operating voltages to said computer, the improvement comprising:

a voltage reference standard, means for comparing said operating voltages with said voltage standard and for providing an output signal indicative of a deviation therefrom greater than a predetermined deviation;

a flip-flop capable of assuming either a set or reset state; means responsive to said output signal for causing said flip-flop to assume said set state;

an AND gate having first and second inputs and an output;

means for providing a signal indicative of a memory write operation;

means for applying the set output of said flip-flop to said first AND gate input and the signal representative of said write operation to said second AND gate input;

means responsive to the output from said AND gate for preventing further operation of said computer; and means responsive to a deviation of said operating voltages from said voltage standard of less than said predetermined deviation for resetting said flip-flop after the predetermined time interval.

References Cited by the Examiner

UNITED STATES PATENTS

| | | | |
|---|---|---|---|
| 2,815,500 | 12/57 | Hance et al. | 340—149 X |
| 3,087,144 | 4/63 | Bianchi et al. | 340—213 |
| 3,120,663 | 2/64 | Beaman et al. | 324—98 X |

IRVING L. SRAGOW, *Primary Examiner.*